United States Patent
Florence et al.

(10) Patent No.: US 10,755,497 B2
(45) Date of Patent: *Aug. 25, 2020

(54) DETACHABLE DRONE FOR MONITORING A MOVING VESSEL

(71) Applicant: International Business Machines Corporation, Armonk, NY (US)

(72) Inventors: Christopher R. Florence, Raleigh, NC (US); Jordan T. Moore, Raleigh, NC (US); Walker L. Sherk, Raleigh, NC (US); Pu Yang, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/520,169

(22) Filed: Jul. 23, 2019

(65) Prior Publication Data

US 2019/0371094 A1 Dec. 5, 2019

Related U.S. Application Data

(63) Continuation of application No. 15/360,839, filed on Nov. 23, 2016, now Pat. No. 10,424,138.

(51) Int. Cl.
*G07C 5/08* (2006.01)
*B63G 8/00* (2006.01)
(Continued)

(52) U.S. Cl.
CPC ............. *G07C 5/0858* (2013.01); *B63C 7/30* (2013.01); *B63G 8/001* (2013.01); *B64C 39/024* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,927,648 A | * | 7/1999 | Woodland | B64D 7/00 244/118.1 |
| 6,056,237 A | * | 5/2000 | Woodland | B64C 3/40 244/3.15 |

(Continued)

FOREIGN PATENT DOCUMENTS

EP 2657135 A2 10/2013

OTHER PUBLICATIONS

Anonymously, "Method and Apparatus for Drone to Aid in Rescue of Lost/Injured Persons", dated Feb. 12, 2016, An IP.com Prior Art Database Technical Disclosure, (online), retrieved from the Internet at URL>http://ip.com/IPCOM/000245134D, Total 4 pages. (Year: 2016).*

(Continued)

*Primary Examiner* — Thomas G Black
*Assistant Examiner* — Ana D Thomas
(74) *Attorney, Agent, or Firm* — Janaki K. Davda; Konrad, Raynes, Davda and Victor LLP (57) ABSTRACT

Provided are techniques for monitoring a moving vessel using a detachable drone coupled to the moving vessel. An event is identified that triggers detachment of the detachable drone from the moving vessel. The detachable drone is detached from the moving vessel. The detachable drone is moved to a predetermined location. A beacon based on beacon data is transmitted from the detachable drone. In response to the detachable drone receiving a request for the data, data collected from monitoring the moving vessel is delivered.

18 Claims, 4 Drawing Sheets

(51) Int. Cl.
  *B64C 39/02* (2006.01)
  *B63C 7/30* (2006.01)
  *B64D 45/00* (2006.01)
  *B63B 79/00* (2020.01)

(52) U.S. Cl.
  CPC ........ *B63B 79/00* (2020.01); *B63G 2008/004* (2013.01); *B64C 2201/042* (2013.01); *B64C 2201/082* (2013.01); *B64C 2201/12* (2013.01); *B64C 2201/141* (2013.01); *B64D 2045/0065* (2013.01)

(56) References Cited

U.S. PATENT DOCUMENTS

| | | | | |
|---|---|---|---|---|
| 8,646,719 | B2* | 2/2014 | Morris | B64C 27/02 244/1 TD |
| 9,223,027 | B1* | 12/2015 | Albright | B63C 9/00 |
| 2016/0137304 | A1* | 5/2016 | Phan | B64C 27/08 244/17.23 |
| 2016/0257415 | A1* | 9/2016 | Ye | B64D 17/00 |
| 2018/0107210 | A1* | 4/2018 | Harnett | B64D 1/02 |

OTHER PUBLICATIONS

Darrow, N. et al.; "Hierarchical Optimal Data Exchange Framework Among Nodes of an Unmanned Vehicle System"; dated Dec. 21, 2015, An IP.com Prior Art Database Technical Disclosure, (online) retrieved from the Internet at URL>http://ip.com/IPCOM/000244554D, Total 7 pages. (Year: 2015).*

Murphy, RR. et al.; "Cooperative use of unmanned sea surface and micro aerial vehicles at Hurrican Wilma";dated Mar. 2008, Journal of Field Robotics, vol. 25, No. 3, Total 17 pages. (Year: 2008).*

Rees, C."Balloon-Assisted UAV Collects Stratospheric Samples in Antarctica", dated Mar. 30, 2015, (online), retrieved from the Internet at URL>http://www.unmannedsystemstechnology.com/2015/03/balloon-assisted-uav-collects-stratospheric-samples-antarctica, Total 2 pages. (Year: 2015).*

Kelland, N."Deep-water Black-box Retrieval", dated Apr. 12, 2009, (online), retrieved from the Internet at URL>http://www.hydro-international.com/content/article/deep-water-black-box-retrieval, Total 4 pages. (Year: 2009).*

Hobson, J. "High Altitude Glider Will Be Dropped From a Balloon" dated May 22, 2014, (online), retrieved from the Internet at URL>http://hackaday.com/2014/05/22/high-altitude-glider-will-be-dropped-from-a-balloon/,Total 14 pages. (Year: 2014).*

Anonymously, "Method and Apparatus for Drone to Aid in Rescue of Lost/Injured Persons", dated Feb. 12, 2016, An IP.com Prior Art Database Technical Disclosure, (online), retrieved from the Internet at URL>http://ip.com/IPCOM/000245134D, Total 4 pages.

Darrow, N. et al.; "Hierarchical Optimal Data Exchange Framework Among Nodes of an Unmanned Vehicle System"; dated Dec. 21, 2015, An IP.com Prior Art Database Technical Disclosure, (online) retrieved from the Internet at URL>http://ip.com/IPCOM/000244554D, Total 7 pages.

Murphy, RR. et al.; "Cooperative use of unmanned sea surface and micro aerial vehicles at Hurrican Wilma";dated Mar. 2008, Journal of Field Robotics, vol. 25, No. 3, Total 17 pages.

Rees, C."Balloon-Assisted UAV Collects Stratospheric Samples in Antarctica", dated Mar. 30, 2015, (online), retrieved from the Internet at URL>http://www.unmannedsystemstechnology.com/2015/03/balloon-assisted-uav-collects-stratospheric-samples-antarctica, Total 2 pages.

Kelland, N."Deep-water Black-box Retrieval", dated Apr. 12, 2009, (online), retrieved from the Internet at URL>http://www.hydro-international.com/content/article/deep-water-black-box-retrieval, Total 4 pages.

Hobson, J. "High Altitude Glider Will Be Dropped From a Balloon" dated May 22, 2014, (online), retrieved from the Internet at URL>http://hackaday.com/2014/05/22/high-altitude-glider-will-be-dropped-from-a-balloon/,Total 14 pages.

US Patent Application, dated Nov. 23, 2016, for U.S. Appl. No. 15/360,839 (54.138), filed Nov. 23, 2016, invented by Christopher R. Florence et al. , Total 22 pages.

Office Action, dated Oct. 5, 2018, for U.S. Appl. No. 15/360,839 (54.138), filed Nov. 23, 2016, invented by Christopher R. Florence et al. , Total 16 pages.

Response to Office Action, dated Jan. 7, 2019, for U.S. Appl. No. 15/360,839 (54.138), filed Nov. 23, 2016, invented by Christopher R. Florence et al. , Total 9 pages.

Notice of Allowance, dated May 9, 2019, for U.S. Appl. No. 15/360,839 (54.138), filed Nov. 23, 2016, invented by Christopher R. Florence et al. , Total 9 pages.

312 Amendment, dated Jul. 22, 2019, for U.S. Appl. No. 15/360,839 (54.138), filed Nov. 23, 2016, invented by Christopher R. Florence et al. , Total 6 pages.

List of Patents and Applications Treated as Related, dated Jul. 23, 2019, Total 2 pages.

* cited by examiner

DETACHABLE DRONE FOR MONITORING A MOVING VESSEL

FIELD

Embodiments of the invention relate to a detachable drone for monitoring a moving vessel. In particular, embodiments of the invention relate to a detachable drone to assist search and rescue in aviation and/or naval accidents.

BACKGROUND

Accidents in aviation are an unfortunate reality. For example, an airplane that goes missing or crashes is a tragedy that leaves the world wondering what fate the airplane and its passengers had. The loss of an airplane may make retrieval of flight recorders difficult, if not impossible, in some cases.

For example, the existing communications grid in extreme cases, such as this one, may not be sufficient to keep in contact with all of the airplanes at all times. Even in established areas, there is not sufficient bandwidth to monitor all of the flight data that an airplane's flight recorder collects. This vulnerability has a significant impact on the families who have lost loved ones and delays delivering closure to those families.

Similarly, naval vessels may suffer from similar issues in the event of an emergency at sea. Naval vessels have voyage data recorders, similar to flight recorders.

SUMMARY

Provided is a method monitoring a moving vessel using a detachable drone coupled to the moving vessel. The method performs operations with a processor of a computer. An event is identified that triggers detachment of the detachable drone from the moving vessel. The detachable drone is detached from the moving vessel. The detachable drone is moved to a predetermined location. A beacon based on beacon data is transmitted from the detachable drone. In response to the detachable drone receiving a request for the data, data collected from monitoring the moving vessel is delivered.

Provided is a computer program product monitoring a moving vessel using a detachable drone coupled to the moving vessel. The computer program product comprises a computer readable storage medium having program code embodied therewith, the program code executable by at least one processor to perform operations. An event is identified that triggers detachment of the detachable drone from the moving vessel. The detachable drone is detached from the moving vessel. The detachable drone is moved to a predetermined location. A beacon based on beacon data is transmitted from the detachable drone. In response to the detachable drone receiving a request for the data, data collected from monitoring the moving vessel is delivered.

Provided is a computer system monitoring a moving vessel using a detachable drone coupled to the moving vessel. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. An event is identified that triggers detachment of the detachable drone from the moving vessel. The detachable drone is detached from the moving vessel. The detachable drone is moved to a predetermined location. A beacon based on beacon data is transmitted from the detachable drone. In response to the detachable drone receiving a request for the data, data collected from monitoring the moving vessel is delivered.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a detachable drone that attaches (e.g., externally) to a moving vessel, monitors and collects data on the moving vessel (e.g., by monitoring sensors of the moving vessel), and assists in retrieval and delivery of the collected data in case the moving vessel is missing, has crashed, has sunk, etc. In particular, the detachable, self-moving drove automatically detaches from the moving vessel with the collected data. The collected data may then be used to determine what happened to the moving vessel.

With embodiments, the moving vessel may be a water-based vessel (e.g., a boat, a ship, a life raft, etc.), an air-based vessel (e.g., an airplane, another drone (such as a military drone), a space shuttle, etc.) or a land-based vessel (e.g., a bus, a car, a truck, motorcycle, etc.). The detachable drone may be attached directly to an external portion of the moving vessel (e.g., placed on outside of airplane) or be attached indirectly to the external portion of the moving vessel (e.g., coupled to the external portion of ship by a tow line).

Figure 1:
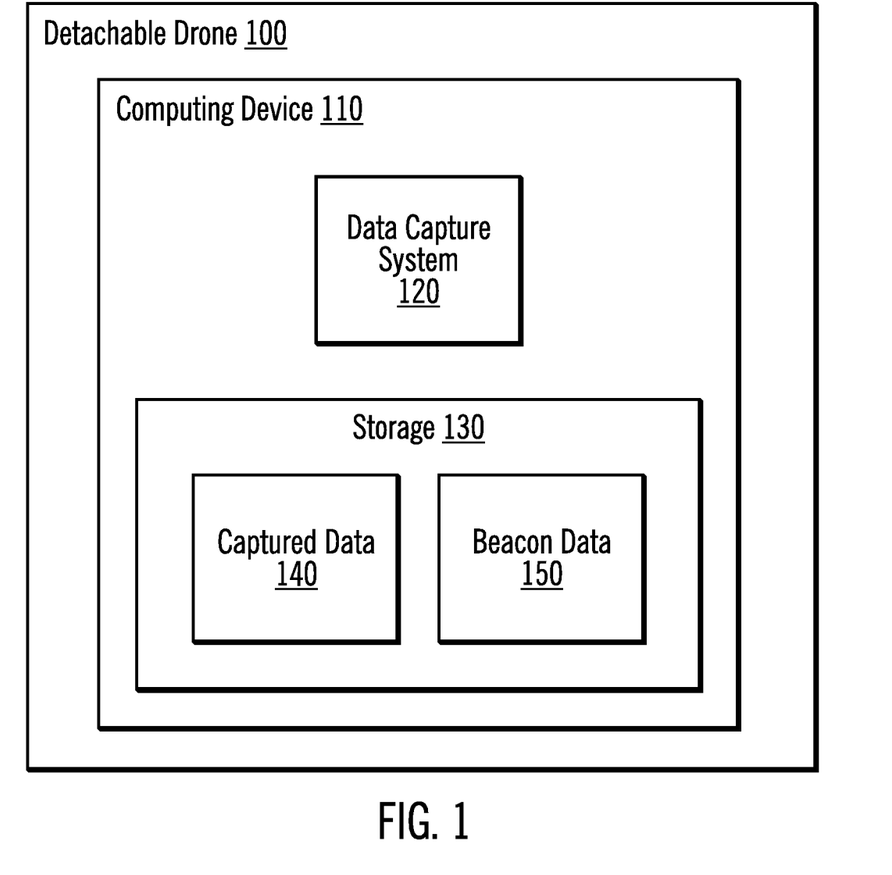
FIG. 1 illustrates, in a block diagram, a computing environment in accordance with certain embodiments.

FIG. 1 illustrates, in a block diagram, a computing environment in accordance with certain embodiments. A detachable drone 100 includes a computing device 110. The computing device 110 includes a data capture system 120 and storage 130. The data capture system 120 stores collected data 140 and beacon data 150 in the storage 130.

The detachable drone 100 is an autonomous and independent drone. The detachable drone 100 may also be described as an Unmanned Aerial Vehicle (UAV), which may be operated in a fully autonomous manner by the data capture system 120. That is, the detachable drone 100 is "self-moving" and may be autonomously moved by the data capture system 120.

The detachable drone 100 may be attached to a moving vessel, and, in response to certain triggers, the data capture system 120 automatically detaches the detachable drone 100 from the moving vessel. The moving vessel may be referred to as a host vessel for the detachable drone 100. With embodiments, the detachable drone 100 is attached to the exterior of the moving vessel (e.g., a conventional aircraft or boat). With embodiments, there are several ways that the detachable drone 100 may be detached/deployed, which all vary based on how the detachable drone 100 is housed. For example, for a water-based vessel (e.g., a ship), the detachable drone 100 may be connected by a tow line to the water-based vessel (so that the detachable drone 100 is already separate from the water-based vessel it is monitoring), in which case detachment of the detachable drone 100 involves cutting the tow line. As another example, for an air-based vessel (e.g., an airplane or a space shuttle), the detachable drone 100 may eject itself, release a parachute, and glide (via the parachute) back to the surface. In other embodiments, for an air-based vessel, the detachable drone 100 slowly lets loose on a line attached to the air-based vessel until stable, which the detachable drone 100 eventually cuts and flies with an option to eject more rapidly in case of severe emergencies.

Flight recorders and voyage data recorders are examples of "black boxes" as used herein. In certain embodiments, the data capture system 120 emulates a black box of a moving vessel by recording 1) data on various parameters continuously or periodically (several times per second) to preserve the recent history of the moving vessel; 2) sounds within and/or external to the moving vessel (e.g., within a cockpit of an airplane or an engine room of a ship); and 3) video feed within and/or external to the moving vessel. With embodiments, the data on the various parameters include measurements of vessel velocity, air pressure in the moving vessel, speed of the moving vessel, and weather conditions, and also readings from one or more (which may be pre-selected) of the moving vessel's sensors. For example, data on fuel levels, engine heat, landing gear, alerts of any kind (especially those that note potential malfunctions) are monitored and recorded.

With embodiments, the detachable drone 100 receives information identical to what is transmitted to one of the moving vessel's existing black boxes. In other embodiments, the detachable drone 100 may receive or retrieve information from a black box.

In embodiments, the detachable drone 100 with the data capture system 120 is separate from the black box and may autonomously act in the event of an emergency. In particular, rather than becoming a piece of the wreckage in case of a crash of the moving vessel, the data capture system 120 automatically detaches the detachable drone 100 from the moving vessel and delivers the detachable drone 100 to an accessible location, which may be pre-designated. The data capture system 120 may move (e.g., fly, roll, etc.) the detachable drone to the accessible location. With embodiments, the detachable drone 100 may move on land, move in water or move through the air. For example, the detachable drone 100 may report the status of, say a tank column, in the desert that has become stranded in some way. The detachable drone 100 may also sail, float (space or water), glide (parachute, un-propelled flight) or sink, as needed. Also, with embodiments, detachable drone 100 of a land-based vessel may drive to a pre-designated location. Moreover, with embodiments, the detachable drone 100 of an air-based vessel may navigate its flight to a pre-designated location (i.e., a specific landing zone or to a point on the air-based vessel's original flight path). With embodiments, the detachable drone 100 may perform different types of movement (e.g., detaching from an airplane, gliding down to water, sailing to land, and driving to a pre-designated location).

Once the detachable drone 100 is away from the moving vessel, the data capture system 120 attempts to communicate using a beacon based on the beacon data 150 (e.g., a conventional ping from a locator beacon). The beacon data may indicate different types of beacons (e.g., sounds, lights or a combination of these) for different situations (e.g., a flashing light at night time). With embodiments, the data capture system 120 assists search and rescue efforts locate the detachable drone 100 since the beacon that is emitted may be able to reach a larger area (when not at or below 20,000 feet underwater).

Thus, for crashes, the data capture system 120 ensures that the collected data 140 survives any impact. With embodiments, the data capture system 120 separates the detachable drone 100 from the moving vessel in the event of an emergency so that that search and rescue workers are able to find the detachable drone 100 and the collected data (which is critical information) even if the black box of the moving vessel is not found or is destroyed.

With embodiments, the data capture system 120 brings the collected data 140 to the surface (if the detachable drone 100 is under water). In certain embodiments, the data capture system 120 and may start delivering the data directly when an event (e.g., detection of a possible crash) occurs.

Embodiments combine the function of a traditional black box with the detachable drone 100. In the event of an emergency, the data capture system 120 detaches the detachable drone 100 from the moving vessel. The data capture system 120 stores the collected data 140, which may include details related to the navigation data and communications of the moving vessel. The data capture system 120 identifies how it will detach the detachable drone 100 and what is appropriate for transit of the detachable drone 100.

For example, events, such as a water landing, may have the detachable drone 100 detach and float to the surface; whereas, a mid-air collision/explosion may cause the detachable drone 100 to glide, parachute or fly to ground level. Once the detachable drone 100 is in an accessible location (i.e., is retrievable), the data capture system 120 transmits a beacon. In addition to electronic transmission, the data capture system 120 may contain radio signal reflecting material to assist in locating the detachable drone 100. With embodiments, the accessibility of the detachable drone 100 and its capacity to move itself may assist in locating the host vessel.

With embodiments, the detachable drone 100 is attached to the exterior of the moving vessel (e.g., a conventional aircraft or boat). Once a trigger event (e.g., an emergency event) is identified, the data capture system 120 starts the detachable drone 100 on a journey to deliver the collected data 140 (e.g., to search and rescue workers).

With embodiments, the destination of the detachable drone 100 may be predetermined locations that are determined before the moving vessel starts its trip. Thus, the location to which the data capture system 120 moves the detachable drone 100 is predefined. For example, if the detachable drone 100 were underwater (after being detached from a naval vessel or submerged airplane), the data capture system 120 would move the detachable drone 100 to the surface of the water by, for example, buoyancy and underwater navigation or by deploying a flotation device. Once on the surface of the water, the data capture system 120 begins to ping over radio frequency and, if possible, maneuver the detachable drone 100 to the nearest predetermined location (e.g., for pickup by a search and rescue worker).

With embodiments, a solar powered cell is incorporated into the detachable drone 100 to allow it to migrate to the predetermined location over a series of flights. With the inclusion of a solar cell, the data capture system 120 may to pulse on radio frequencies for more than the month that a conventional beacon typically maintains. Also, the higher energy and position of the detachable drone 100 allow for a greater range for the beacon.

Figure 2:
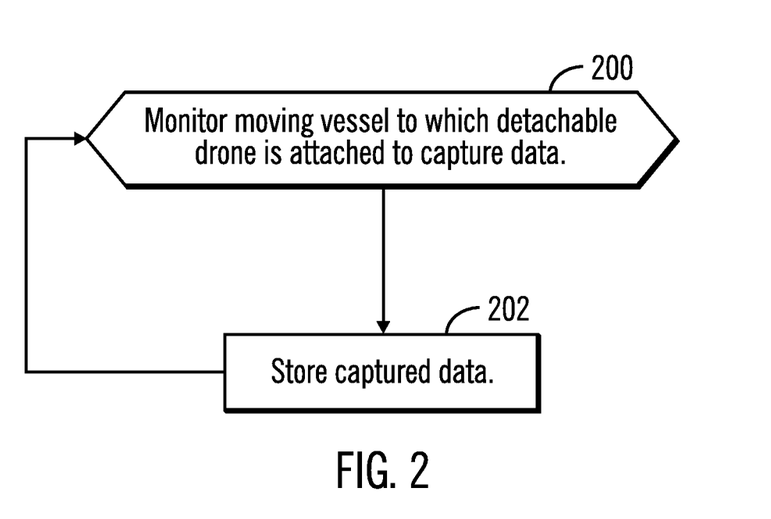
FIG. 2 illustrates, in a flow chart, operations for monitoring a moving vessel in accordance with certain embodiments.

FIG. 2 illustrates, in a flow chart, operations for monitoring a moving vessel in accordance with certain embodiments. Control begins at block 200 with the data capture system 120 monitoring a moving vessel to which detachable drone 100 is attached to capture data. In certain embodiments, the moving vessel has various that are monitored. In block 202, the data capture system 120 stores the captured data. In certain embodiments, the captured data transmit provides information about a failure (e.g., a catastrophic failure) or an impending destruction of the host vessel.

Figure 3:
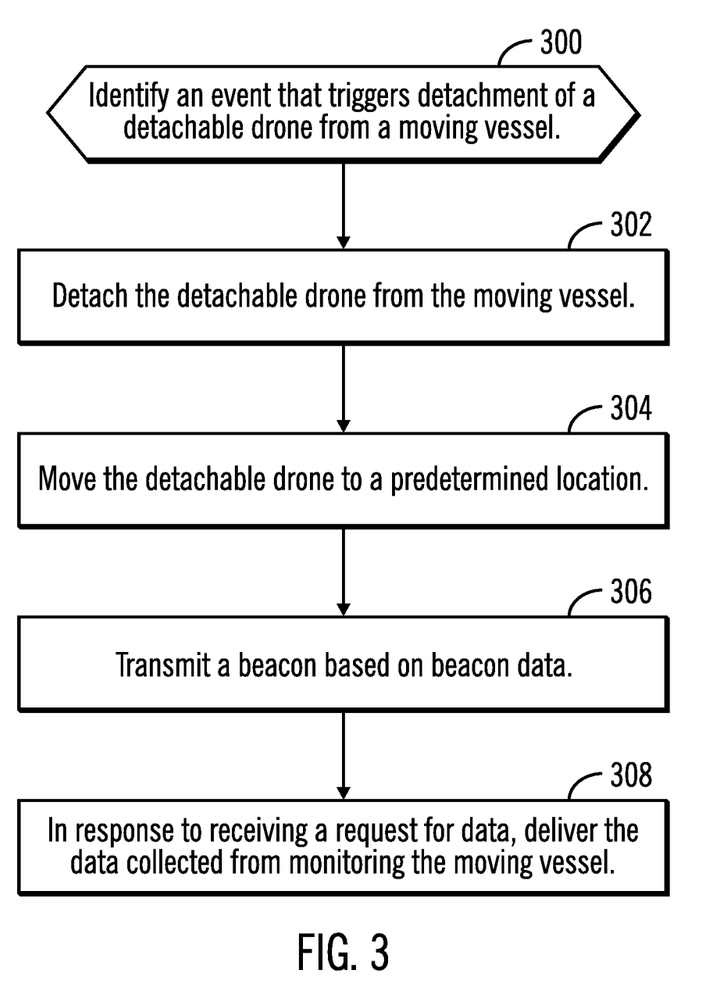
FIG. 3 illustrates, in a flow chart, operations for delivering captured data in accordance with certain embodiments.

FIG. 3 illustrates, in a flow chart, operations for delivering captured data in accordance with certain embodiments. Control begins at block 300 with the data capture system 120 identifying an event that triggers detachment of a detachable drone 100 from a moving vessel. For example, the event may be a decrease in air pressure of the moving vessel, may be a sudden change in direction of the moving vessel, may be detection of excessive heat (e.g., due to a fire) of the moving vessel, may be detection of malfunctioning parts (e.g., landing gear), may be breaks in certain thresholds (e.g., a steep delta in altitude or a very low value outside of the typical flight path), may be manual ejection (e.g., by pilots), etc. That is, the data capture system 120 performs analysis on the data being captured to determine when to detach the detachable drone 100.

In block 302, the data capture system detaches the detachable drone 100 from the moving vessel. In block 304, the data capture system moves the detachable drone 100 to a predetermined location. In block 306, the data capture system transmits a beacon based on beacon data. In block 308, the data capture system, in response to a request for data, delivers data collected from monitoring the moving vessel. In certain embodiments, a code (e.g., a password) is provided by a user to the data capture system 120 to access the captured data. In other embodiments, the data is encrypted, and a key is required to decrypt the data. The request for data indicates that the detachable drone 100 has been located. Delivery of the data may include displaying the data on a computer screen, emailing a report of the data, printing the data to a printer, saving the data to a file in a file system, etc. With embodiments, the data capture system 120 stores the data (e.g., a backup copy) to another device, such as a node in a cloud or other network.

In certain embodiments, multiple detachable drones, each with a different data capture system, may be attached to a moving vessel. The different data capture systems may each detach based on a different set of conditions.

Figure 4:
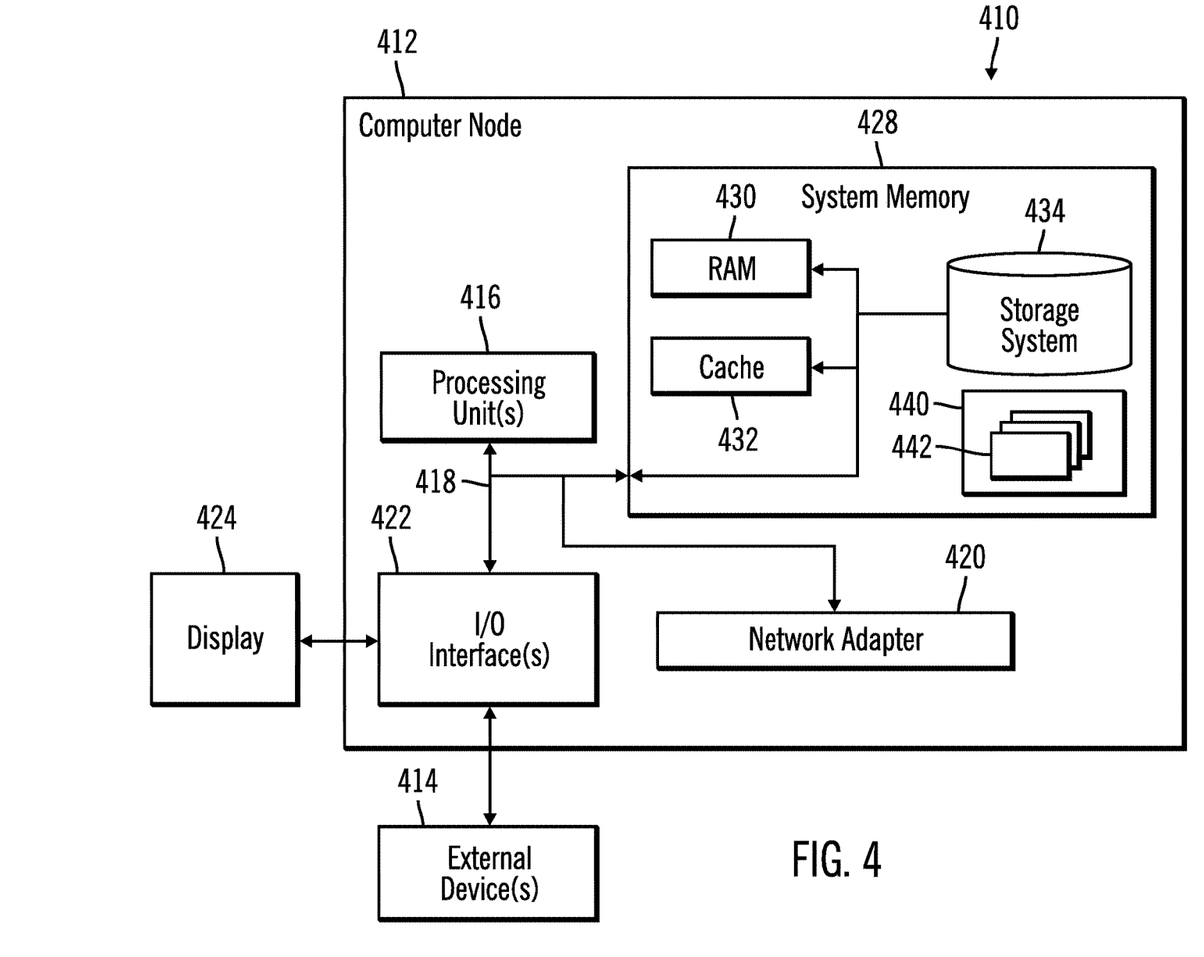
FIG. 4 illustrates a computing node in accordance with certain embodiments.

FIG. 4 illustrates a computing environment 410 in accordance with certain embodiments. Referring to FIG. 4, computer node 412 is only one example of a suitable computing node and is not intended to suggest any limitation as to the scope of use or functionality of embodiments of the invention described herein. Regardless, computer node 412 is capable of being implemented and/or performing any of the functionality set forth hereinabove.

The computer node 412 may be a computer system, which is operational with numerous other general purpose or special purpose computing system environments or configurations. Examples of well-known computing systems, environments, and/or configurations that may be suitable for use with computer node 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer node 412 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 4, computer node 412 is shown in the form of a general-purpose computing device. The components of computer node 412 may include, but are not limited to, one or more processors or processing units 416, a system memory 428, and a bus 418 that couples various system components including system memory 428 to one or more processors or processing units 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 412 typically includes a variety of computer system readable media. Such media may be any available media that is accessible by computer node 412, and it includes both volatile and non-volatile media, removable and non-removable media.

System memory 428 can include computer system readable media in the form of volatile memory, such as random access memory (RAM) 430 and/or cache memory 432. Computer node 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, system memory 428 may include at least one program product having a set (e.g., at least one) of program modules that are configured to carry out the functions of embodiments of the invention.

Program/utility 440, having a set (at least one) of program modules 442, may be stored in system memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer node 412 may also communicate with one or more external devices 414 such as a keyboard, a pointing device, a display 424, etc.; one or more devices that enable a user to interact with computer node 412; and/or any devices (e.g., network card, modem, etc.) that enable computer node 412 to communicate with one or more other computing devices. Such communication can occur via Input/Output (I/O) interfaces 422. Still yet, computer node 412 can communicate with one or more networks such as a local area network (LAN), a general wide area network (WAN), and/or a public network (e.g., the Internet) via network adapter 420. As depicted, network adapter 420 communicates with the other components of computer node 412 via bus 418. It should be understood that although not shown, other hardware and/or software components could be used in conjunction with computer node 412. Examples, include, but are not limited to: microcode, device drivers, redundant processing units, external disk drive arrays, RAID systems, tape drives, and data archival storage systems, etc.

Computing device 100 may take the form of computer node 412.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for monitoring a moving vessel using a detachable drone coupled to the moving vessel, comprising:
    capturing data about the moving vessel;
    identifying an event that triggers detachment of the detachable drone from the moving vessel based on analysis of the captured data, wherein the detachable drone is one of attached directly to an external portion of the moving vessel and attached indirectly to the external portion of the moving vessel;
    detaching the detachable drone from the moving vessel;
    moving the detachable drone to a predetermined location;
    transmitting a beacon based on beacon data from the detachable drone; and
    in response to the detachable drone receiving a request for the data, delivering data collected from monitoring the moving vessel.

2. The computer-implemented method of claim 1, further comprising:
    while monitoring the moving vessel,
        capturing the data about the moving vessel; and
        storing the data.

3. The computer-implemented method of claim 1, wherein moving the detachable drone to the predetermined location comprises floating up to a surface of water in response to the detachable drone detaching under water.

4. The computer-implemented method of claim 1, wherein moving the detachable drone to the predetermined location comprises gliding down to a surface of solid ground in response to the detachable drone detaching mid-air.

5. The computer-implemented method of claim 1, wherein the detachable drone comprises radio signal reflecting material to assist in locating the detachable drone.

6. The computer-implemented method of claim 1, wherein the detachable drone comprises a solar powered cell.

7. A computer program product for monitoring a moving vessel using a detachable drone coupled to the moving vessel, the computer program product comprising a computer readable storage medium having program code embodied therewith, the program code executable by at least one processor to perform:
    capturing data about the moving vessel;
    identifying an event that triggers detachment of the detachable drone from the moving vessel based on analysis of the captured data, wherein the detachable drone is one of attached directly to an external portion of the moving vessel and attached indirectly to the external portion of the moving vessel;
    detaching the detachable drone from the moving vessel;
    moving the detachable drone to a predetermined location;
    transmitting a beacon based on beacon data from the detachable drone; and
    in response to the detachable drone receiving a request for the data, delivering data collected from monitoring the moving vessel.

8. The computer program product of claim 7, wherein the program code is executable by the at least one processor to perform:
    while monitoring the moving vessel,
        capturing the data about the moving vessel; and
        storing the data.

9. The computer program product of claim 7, wherein moving the detachable drone to the predetermined location comprises floating up to a surface of water in response to the detachable drone detaching under water.

10. The computer program product of claim 7, wherein moving the detachable drone to the predetermined location comprises gliding down to a surface of solid ground in response to the detachable drone detaching mid-air.

11. The computer program product of claim 7, wherein the detachable drone comprises radio signal reflecting material to assist in locating the detachable drone.

12. The computer program product of claim 7, wherein the detachable drone comprises a solar powered cell.

13. A computer system for monitoring a moving vessel using a detachable drone coupled to the moving vessel, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:
    capturing data about the moving vessel;
    identifying an event that triggers detachment of the detachable drone from the moving vessel based on analysis of the captured data, wherein the detachable drone is one of attached directly to an external portion of the moving vessel and attached indirectly to the external portion of the moving vessel;
    detaching the detachable drone from the moving vessel;
    moving the detachable drone to a predetermined location;
    transmitting a beacon based on beacon data from the detachable drone; and
    in response to the detachable drone receiving a request for the data, delivering data collected from monitoring the moving vessel.

14. The computer system of claim 13, wherein the operations further comprise:
    while monitoring the moving vessel,
        capturing the data about the moving vessel; and
        storing the data.

15. The computer system of claim 13, wherein moving the detachable drone to the predetermined location comprises floating up to a surface of water in response to the detachable drone detaching under water.

16. The computer system of claim 13, wherein moving the detachable drone to the predetermined location comprises gliding down to a surface of solid ground in response to the detachable drone detaching mid-air.

17. The computer system of claim 13, wherein the detachable drone comprises radio signal reflecting material to assist in locating the detachable drone.

18. The computer system of claim 13, wherein the detachable drone comprises a solar powered cell.

* * * * *